US007787212B2

(12) United States Patent
Haynes et al.

(10) Patent No.: US 7,787,212 B2
(45) Date of Patent: Aug. 31, 2010

(54) STIFFNESS REDUCING FEATURES IN A TOP LAYER OF A LAMINATED TOP COVER

(75) Inventors: Jonathan S. Haynes, Petersham, MA (US); Michael A. Finn, Parker, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 781 days.

(21) Appl. No.: 11/671,685

(22) Filed: Feb. 6, 2007

(65) Prior Publication Data

US 2007/0206322 A1 Sep. 6, 2007

Related U.S. Application Data

(60) Provisional application No. 60/772,334, filed on Feb. 10, 2006.

(51) Int. Cl.
*G11B 33/08* (2006.01)

(52) U.S. Cl. .................................................. 360/97.02

(58) Field of Classification Search ....................... None
See application file for complete search history.

(56) References Cited

U.S. PATENT DOCUMENTS 5,214,549 A * 5/1993 Baker et al. .............. 360/97.02
5,282,100 A 1/1994 Tacklind et al.
5,666,239 A * 9/1997 Pottebaum ............... 360/97.03
5,761,184 A 6/1998 Dauber et al.
5,781,373 A 7/1998 Larson et al.
5,982,580 A 11/1999 Woldemar et al.
6,177,173 B1 * 1/2001 Nelson ....................... 428/137
6,308,961 B1 * 10/2001 Kunikane et al. ........... 277/637
6,469,864 B2 * 10/2002 Kamezawa et al. ...... 360/97.01
6,498,700 B2 * 12/2002 Takahashi et al. ........ 360/97.01
6,525,931 B2 * 2/2003 Yagenji et al. ......... 361/679.33
6,529,345 B1 3/2003 Butler et al.
6,536,555 B1 * 3/2003 Kelsic et al. ................ 181/207
6,621,658 B1 * 9/2003 Nashif ..................... 360/97.02
6,674,608 B1 1/2004 Bernett
6,697,213 B2 2/2004 Lofstrom et al.
6,721,128 B1 * 4/2004 Koizumi et al. .......... 360/97.02
6,747,840 B2 6/2004 Daniel et al.
6,950,275 B1 9/2005 Ali et al.
6,954,328 B2 * 10/2005 Daniel et al. ............. 360/97.01
7,292,406 B1 * 11/2007 Huang ..................... 360/97.02
7,385,784 B1 * 6/2008 Berding et al. ........... 360/97.02

* cited by examiner

*Primary Examiner*—Mark Blouin
(74) *Attorney, Agent, or Firm*—Leanne Taveggia Farrell; Westman, Champlin & Kelly, P.A.

(57) ABSTRACT

Stiffness reducing features for top covers of data storage systems are provided to prevent delaminating of top layers of the top covers. A top cover for a data storage system includes a bottom layer, a top layer and an adhesive layer that interconnects the top and bottom layers. At least one groove is formed in and extends along the top layer. The at least one groove reduces a thickness of the top layer along the at least one groove.

16 Claims, 4 Drawing Sheets

130

128
126
124
106
122
112
114
131
120
133
116
102
100

STIFFNESS REDUCING FEATURES IN A TOP LAYER OF A LAMINATED TOP COVER

CROSS REFERENCE TO RELATED APPLICATIONS

This application claims the benefit of U.S. Provisional Application 60/772,334 filed on Feb. 10, 2006 entitled "COVER COINING TO PREVENT DELAMINATION," the entire disclosure of which is hereby incorporated by reference in its entirety.

BACKGROUND

A typical disk drive includes a housing having a base, a top cover and a printed circuit board assembly (PCBA). The housing encloses at least one disk that is rotated by a spindle motor and an actuator assembly is used to position one or more transducers along each disk to read and/or write information to particular locations on each disk. The transducers are mounted to a suspension of the actuator assembly. The suspension maintains the transducers adjacent to or in contact with the data surface of each disk. A voice coil motor is used to precisely position the actuator assembly. Typically, the PCBA is mounted under the base plate to isolate it from components, which are enclosed by the housing.

The top cover can include a laminated design having multiple layers. The layers of the top cover are bonded together by a visco-elastic adhesive. The adhesive layer provides acoustic isolation to prevent undesirable acoustics from propagating beyond the housing of the disk drive, which otherwise might deleteriously effect operation of the computing device in which the disk drive is installed.

During operation of the disk drive, heat is generated from the disk drive components, creating thermal stresses on the disk drive housing. Because of the dimensional variation of the individual layers in the top cover, as well as the different materials that may comprise the top cover, thermal stresses can cause delaminating of the layers. Additional forces can also be transferred to the top cover, such as bending stresses caused by the particular geometry of the top cover and the position of the securing screws that secure the top cover to the base of the housing. For example, when the securing screws are tightened, stresses are transferred to the top cover that can also contribute to delaminating of the layers of the top cover. The combined thermal and screw induced stresses can ultimately cause adhesive failure of the adhesive layer, and significant separation of layers of the top cover. Separation of the layers can result in inadequate acoustic control, as well as violation of form factor requirements of the disk drive.

SUMMARY

At least one stiffness reducing feature is provided for a top cover of a data storage system to prevent delaminating top layers in a laminated top cover. The at least one stiffness reducing feature includes a groove and reduces a thickness of a top layer of the top cover. The top cover includes a bottom layer, a top layer and an adhesive layer that interconnects the top and bottom layers. At least one groove is formed in and extends along the top layer. The at least one groove reduces a thickness of the top layer along the at least one groove.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
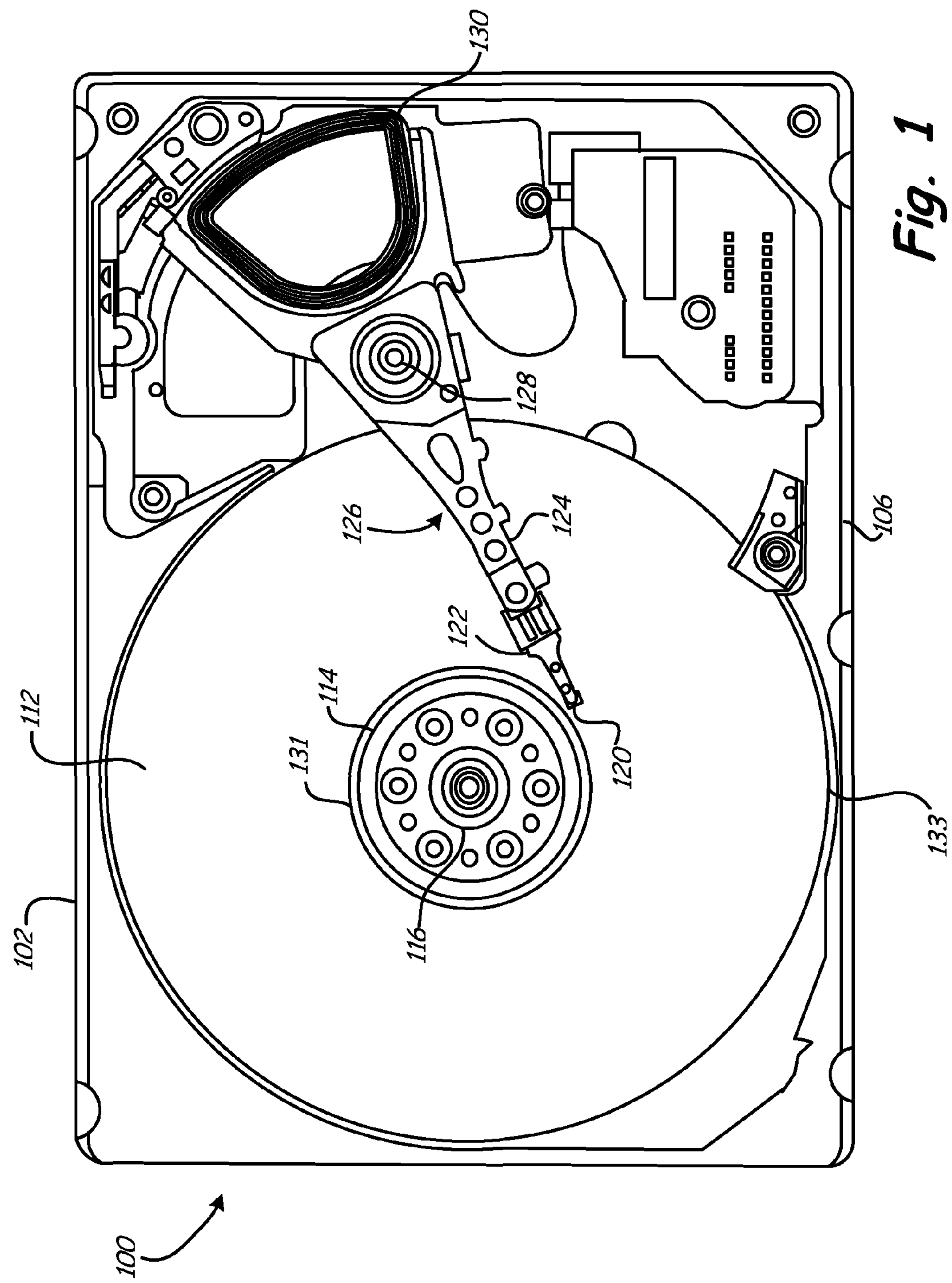
FIG. 1 is a top view of a disk drive with a top cover removed.

FIG. 1 is an exploded perspective view of a disc drive 100 in which embodiments of the present invention are useful. Disk drives are common data storage systems. One or more embodiments of the present invention are also useful in other types of data storage and non-data storage systems.

Disk drive 100 includes a housing 102 having a top cover (not illustrated in FIG. 1) and a base 106. A plurality of components are positioned in disc drive 100 and are enclosed in housing 102. Disk drive 100 includes one or more disks or media 112. Disk drive 100 illustrates a single medium 112 that stores information in a plurality of circular, concentric data tracks and is mounted on a spindle motor 114, for example, by a disk clamp 116. As illustrated in FIG. 1, a top surface of medium 112 has an associated slider 120, which carries transducers that communicate with the top surface of the medium.

In the example shown in FIG. 1, slider 120 is supported by a suspension assembly 122, which is, in turn, attached to an actuator arm 124 of an actuator assembly 126. Actuator assembly 126 is laterally rotated about a shaft 128 by a voice coil motor 130. Voice coil motor 130 rotates actuator assembly 126 to position slider 120 relative to desired data tracks, between a disc inner diameter 131 and a disc outer diameter 133.

Figure 2:
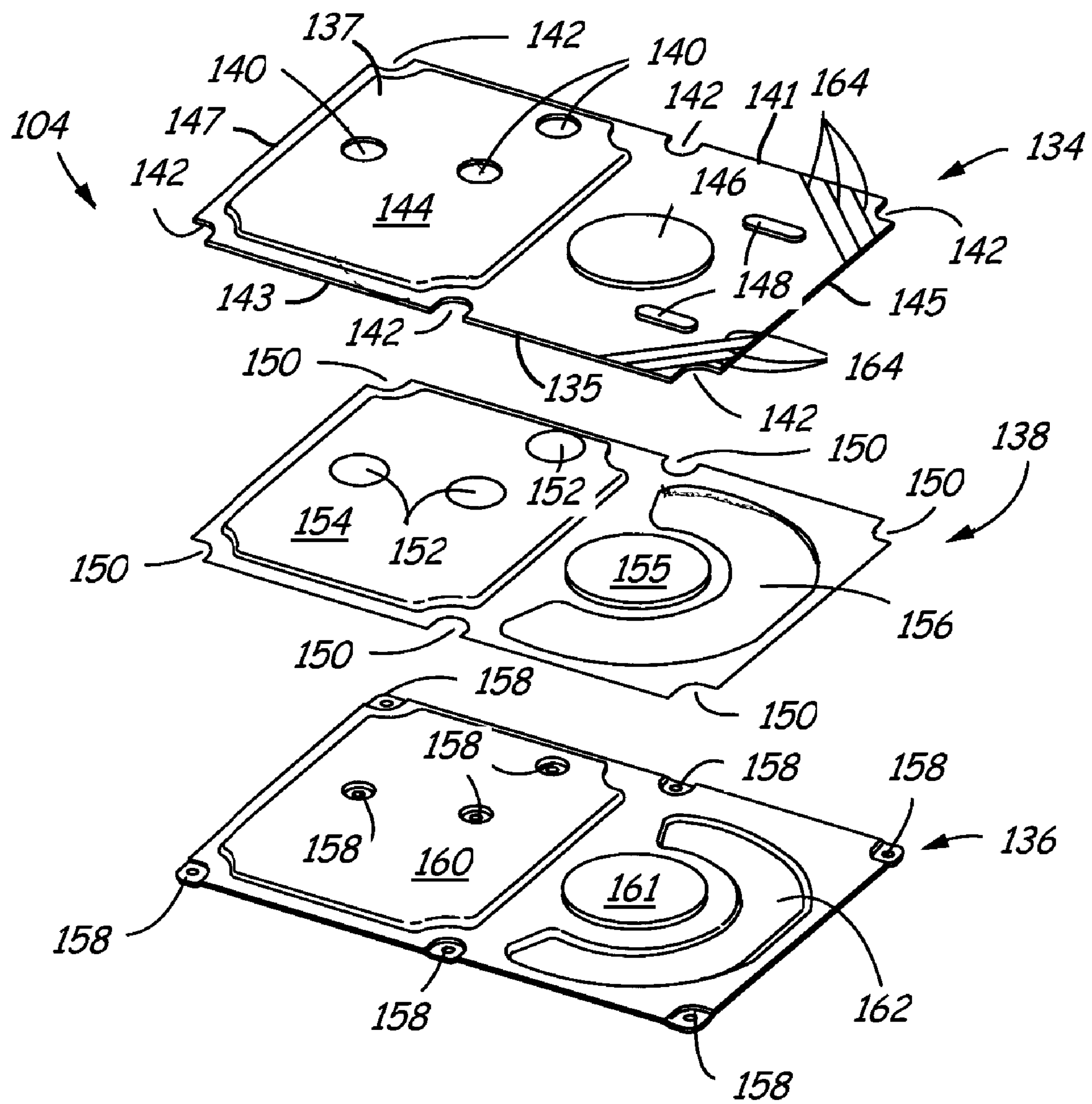
FIG. 2 is an exploded perspective view of a top cover of a disk drive.
Figure 3:
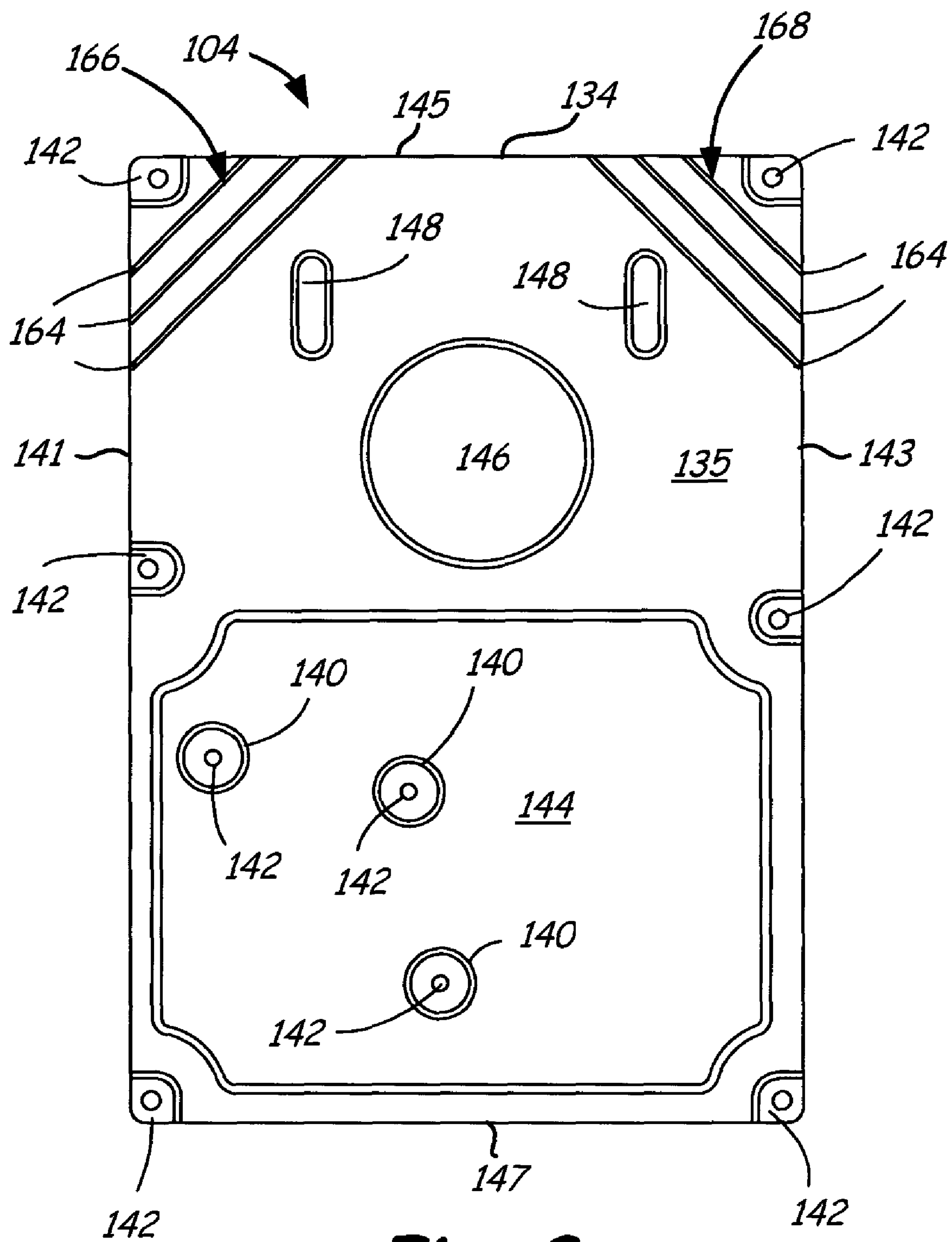
FIG. 3 is a plan view of a bottom facing surface of a top layer of the top cover.

FIGS. 2 and 3 illustrate a top cover 104 of a disk drive, such as disk drive 100. FIG. 2 is an exploded perspective view of top cover 104, while FIG. 3 is a plan view of a portion of top cover 104. Top cover 104 includes a top layer 134, a bottom layer or base 136, and an adhesive layer 138. Top layer 134 includes a bottom facing surface 135 and a top facing surface 137. Adhesive layer 138 is positioned between bottom layer 136 and bottom facing surface 135 and adheres or interconnects the top layer 134 and bottom layer 136 to one another. The adhesive layer 138 is constructed of a visco-adhesive material to provide dampening of acoustic noise generated by the disk drive during operation. As understood by those skilled in the art, the decibel level of the noise generated by the disk drive during operation must be reduced in order to meet the acoustic specifications for the drive. Without the dampening layer provided by the adhesive layer 138, the drive would generate excessive acoustic noise and would therefore exceed dampening requirements.

The top 134 and bottom 136 layers may be made of a metallic material, such as a specified steel or aluminum. The thickness of bottom layer 136 and top 134 layer can vary according to disk drive specifications, however, the bottom or base layer 136 provides the primary structural support for covering the components of the disk drive and is therefore thicker than the top layer 134.

Top layer 134 includes a first lengthwise edge 141 and an opposing second lengthwise edge 143. Top layer 134 also includes a first widthwise edge 145 and an opposing second widthwise edge 147. Top layer 134 has a number of discrete features including a plurality of apertures 140 that provide openings for securing screws, and cutouts 142 formed at the four corners of the top layer 134 and along first and second lengthwise edges 141 and 143 of top layer 134 to also accommodate the placement of securing screws through the bottom layer 136. Other discrete features of top layer 134 include one or more raised form features that provide clearance for internal components of the disk drive. In the example of FIG. 2, the raised form feature 144 can provide clearance for the voice coil motor and actuator assembly, while the raised form feature 146 can provide clearance for the spindle. Features 148 can be provided for test drops to determine shock compliance of the disk drive. Features 144, 146 and 148 are simply representative of any features that can be formed in top layer 134 to accommodate other internal components of the drive or to enable drive performance testing.

Adhesive layer 138 is also characterized by a number of features, including cutouts 150, apertures 152, and raised form features 154 and 155. An elliptical shaped slot 156 can also be formed in the adhesive layer to accommodate internal components of the disk drive, or to simply accommodate the particular configuration of the bottom layer 136.

With reference to bottom layer 136, this layer is characterized by a plurality of flattened ear sections 158 with screw holes to receive the securing screws. Raised form feature 160, along with raised form feature 161 can provide clearance for the internal drive components, namely, the voice coil, actuator, and spindle. A lowered or depressed area 162 is also shown, having a corresponding elliptical shape as the opening 156 in the adhesive layer 138.

Top layer 134 further includes at least one stiffness reducing feature 164. Each stiffness reducing feature 164 is shown as a linearly extending groove spaced from one another along top layer 134 and in parallel with each other. With reference to FIG. 3 and in one embodiment, each groove is formed on bottom facing surface 135 of top layer 134. A first group of grooves 166 extend linearly between first lengthwise edge 141 and first widthwise edge 145. A second group of grooves 168 extend linearly between second lengthwise edge 143 and first widthwise edge 145. Specifically, each groove 164 extends diagonally to the adjacent side edges of top layer 134.

Figure 4:
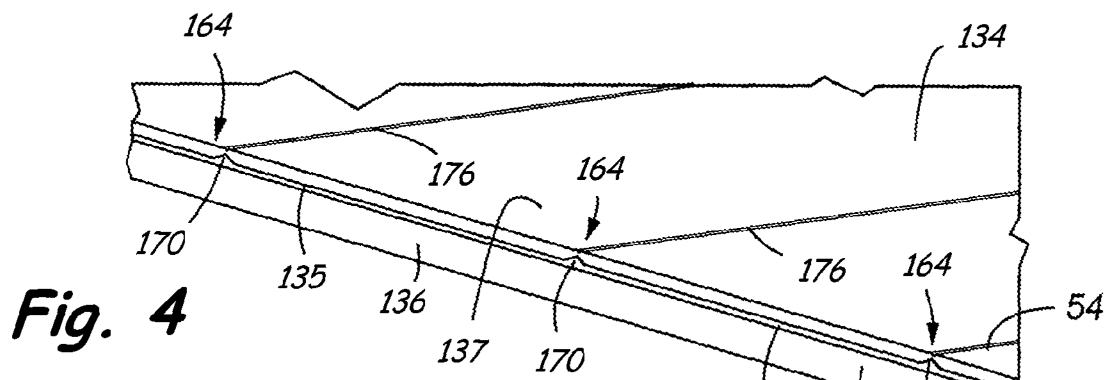
FIG. 4 is an enlarged fragmentary perspective view illustrating stiffness reducing features.
Figure 5:
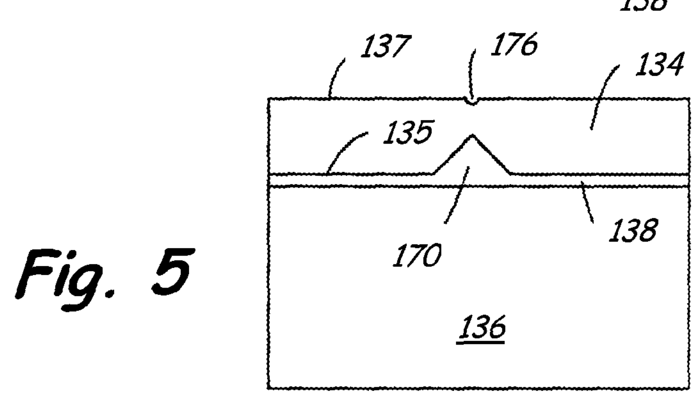
FIG. 5 is an enlarged sectional view illustrating one embodiment of each stiffness reducing feature in a top layer of a top cover.

FIG. 4 is an enlarged fragmentary perspective view of top cover 104 including top layer 134, bottom layer 136 and adhesive layer 138. FIG. 4 illustrates stiffness reducing features 164. As previously discussed, in one embodiment, stiffness reducing features 164 comprise grooves that are formed on bottom facing surface 135, which opposes top facing surface 137 of top layer 134. As illustrated in the embodiment of FIG. 4, and as also shown in a sectional view in FIG. 5, one type of groove that can be formed is a v-shaped groove 170.

Figure 6:
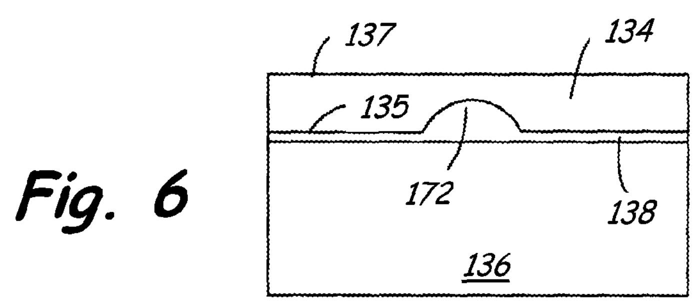
FIG. 6 is an enlarged sectional view illustrating another embodiment of each stiffness reducing feature in a top layer of a top cover.
Figure 7:
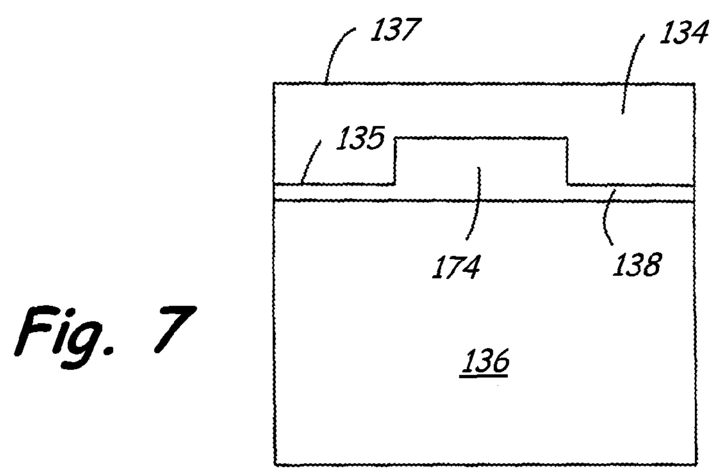
FIG. 7 is an enlarged sectional view illustrating yet another embodiment of each stiffness reducing feature in a top layer of a top cover.

FIGS. 6 and 7 illustrate enlarged sectional views of other type of grooves in top layer 134 of top cover 104. Specifically, FIG. 6 illustrates an arcuate shape groove 172, while FIG. 7 illustrates a rectangular shaped groove 174. The grooves 170, 172 and 174 can be formed in a number of metal forming operations, such as by compressing top layer 134. As shown in FIG. 4, a slight indentation 176 can be formed on top facing surface 137 of top layer 134, depending upon how the top layer 134 is supported during the metal forming operation. The indentation 176 can also be referred to as a trace line. In forming the stiffness reducing features 164 in top layer 134, a reduced thickness results along the features 164 thereby enabling the top layer 134 to more easily bend or deflect in response to stresses induced upon top cover 104. In this regard, the stiffness reducing features 164 act as a hinge. By providing this additional bending or deflection capability, the top layer 134 better conforms to any deflection or change in shape of the bottom layer 136, thereby reducing force on adhesive layer 138 and enabling adhesive layer 138 to keep top 134 and bottom 136 layers joined to one another.

The particular location, orientation, spacing and size of stiffness reducing features 164 can be chosen to incrementally reduce delaminating in areas that receive induced stresses. Through thermal stress analysis, stressed areas on the top cover 104 can be identified. As illustrated in FIGS. 2-7, high stress areas can be located between first lengthwise edge 141 and first widthwise edge 145 of cover 104, between second lengthwise edge 143 and first widthwise edge 145 and near the corner screw hole locations. It is noted that if a top cover, such as top cover 104, has raised form features, the stress levels on the top cover at those locations can be somewhat reduced because the top cover can more easily bend along those raised form features.

Stiffness reducing features 164 are shown as being disposed parallel to one another, and extending linearly along top layer 134. However, it is also contemplated that the stiffness reducing features 164 can be irregularly spaced, may have irregular shapes, or may be provided in combinations thereof in order to best provide additional flexibility for top layer 134. Depending upon the locations of various raised form features, or other irregularities formed on top cover 104, stiffness reducing features 164 can be selectively located to best reduce high stress areas.

With respect to the specific construction of the layers of the top cover and particularly the arrangement of the various features illustrated, it shall be understood that the specific construction illustrated is simply representative of one type of disk drive, and the stiffness reducing features of the present invention can be incorporated in a multitude of different top cover constructions having multiple layers.

The advantages of the disclosed embodiments are clear. The deleterious effects of thermal and mechanical stresses induced on a top cover can be reduced thereby preventing the delaminating of the top layer of top covers. Maintaining the top cover in its specified shape and thickness helps to ensure that the top cover does not violate form factor requirements, or acoustic requirements. Stress reduction is achieved with an effective but simple modification to the top layer of the top cover, which does not otherwise degrade the performance of the top cover and maintains structural integrity of the top cover.

It is to be understood that even though numerous characteristics and advantages of various embodiments of the disclosure have been set forth in the foregoing description, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the particular application of the top cover while maintaining substantially the same functionality without departing from the scope and spirit of the disclosure. In addition, although the embodiments described herein are directed to an stiffness reducing feature for a top cover of a disc drive, it will be appreciated by those skilled in the art that the teachings of the disclosure can be applied to other types of data storage systems, without departing from the scope and spirit of the disclosure.

What is claimed is:

1. A top cover for a data storage system comprising:

a bottom layer;

a top layer including:

a first lengthwise edge and an opposing second lengthwise edge;

a first widthwise edge and an opposing second widthwise edge;

at least one groove recessed into and extending along a bottom surface of the top layer;

an adhesive layer interconnecting the bottom layer to the bottom surface of the top layer; and wherein each groove extends between the first lengthwise edge and the first widthwise edge of the top layer.

2. The top cover of claim 1, further comprising at least one indention formed on a top facing surface of the top layer and opposite each groove recessed into the bottom surface of the top layer, the at least one indention recessed into and extending along the top layer from a top surface to a point in the top layer that is between the recessed groove and the top surface.

3. The top cover of claim 1, wherein the at least one groove has an arcuate shaped cross-section.

4. The top cover of claim 1, wherein the at least one groove has a rectangular shaped cross-section.

5. The top cover of claim 1, wherein each groove is arranged to extend substantially parallel to one another along the top layer.

6. The top cover of claim 1, wherein each groove is arranged in a first group of grooves that extend linearly along the top cover and parallel to one another.

7. The top cover of claim 6, further comprising at least one groove arranged in a second group of grooves that extend linearly along the top cover and parallel to one another.

8. The top cover of claim 7, wherein each groove in the second group of grooves extends between the second lengthwise edge and the first widthwise edge of the top layer.

9. A data storage system comprising:

a base;

a top cover comprising:

a bottom layer;

a top layer having a top facing surface, an opposing bottom facing surface, a first lengthwise edge and an opposing second lengthwise edge;

an adhesive layer interconnecting the top and bottom layers; and at least one groove formed in the bottom facing surface of the top layer, the at least one groove reduces a thickness of the top layer along the at least one groove and is oriented to linearly extend between the first lengthwise edge and the first widthwise edge and intersect with the first lengthwise edge and the first widthwise edge.

10. The data storage system of claim 9, wherein each groove is arranged to extend substantially parallel to one another along the bottom facing surface of the top layer.

11. The data storage system of claim 9, further comprising at least one groove that is oriented to extend between the second lengthwise edge and the first widthwise edge of the top layer.

12. The data storage system of claim 11, wherein the at least one groove that extends between the first lengthwise edge and the first widthwise edge of the top layer extends along a line that intersects with the at least one groove that extends between the second lengthwise edge and the first widthwise edge of the top layer.

13. The data storage system of claim 9, further comprising at least one indention formed on the top facing surface of the top layer and opposite each groove formed in the bottom facing surface of the top layer, the at least one indention recessed into the top layer from the top facing surface to a point in the top layer that is between the recessed groove and the top facing surface.

14. A top cover for a data storage system comprising:

a bottom layer;

a top layer having a bottom facing surface and a top facing surface;

an adhesive layer positioned between the bottom layer and the bottom facing surface of the top layer; and means for reducing stiffness in the top layer, the means for reducing stiffness recessed into the top layer from the bottom facing surface to a point in the top layer that is between the bottom facing surface and the top facing surface to reduce stiffness in the top layer to conform with changes in shape of the bottom layer and reduce force on the adhesive layer.

15. The top cover of claim 14, wherein the means for reducing stiffness are arranged in a first group and a second group.

16. The top cover of claim 15, wherein the first group of the means for reducing stiffness is formed between a first lengthwise edge and a first widthwise edge of the top layer and formed between a second lengthwise edge opposing the first lengthwise edge and the first widthwise edge of the top layer.

* * * * *